United States Patent [19]

Thrasher, Jr.

[11] 4,105,095
[45] Aug. 8, 1978

[54] INJECTION LUBRICATING APPARATUS
[75] Inventor: George E. Thrasher, Jr., Pontiac, Mich.
[73] Assignee: Master Pneumatic-Detroit, Inc., Sterling Heights, Mich.
[21] Appl. No.: 801,529
[22] Filed: May 31, 1977
[51] Int. Cl.² ............................................. F16N 13/16
[52] U.S. Cl. .................................. 184/55 A; 184/29; 184/96; 116/117 C
[58] Field of Search ............... 184/55 A, 55 R, 56 R, 184/29, 96, 97; 116/117 C, 117 B, 117 R; 73/194 C

[56] References Cited

U.S. PATENT DOCUMENTS

| 1,889,705 | 11/1932 | Sherwood | 116/117 BX |
|---|---|---|---|
| 3,672,467 | 6/1972 | Fleissner | 184/96 X |
| 3,841,438 | 10/1974 | Tine et al. | 116/117 CX |
| 3,926,279 | 12/1975 | Thrasher | 184/29 |

FOREIGN PATENT DOCUMENTS 850,226  10/1960  United Kingdom ............... 116/117 R

*Primary Examiner*—David H. Brown
*Attorney, Agent, or Firm*—Barnes, Kisselle, Raisch & Choate

[57] ABSTRACT

In a lubricator which employs an injection pump controlled by an air flow sensor to force a predetermined quantity of lubricant into an air line or tool upon each starting of air flow therein, an improved sight indicator for lubricant flow which comprises a ball in a 45° bore in a portion of the lubricant flow path in a transparent dome, the ball seating gravitationally at the bottom of the bore in static condition of the lubricant and being movable upwardly responsive to pulsations of lubricant flow through the flow path, the dome being bodily turnable against frictional resistance provided by O-rings to orient the bore axis vertically.

30 Claims, 6 Drawing Figures

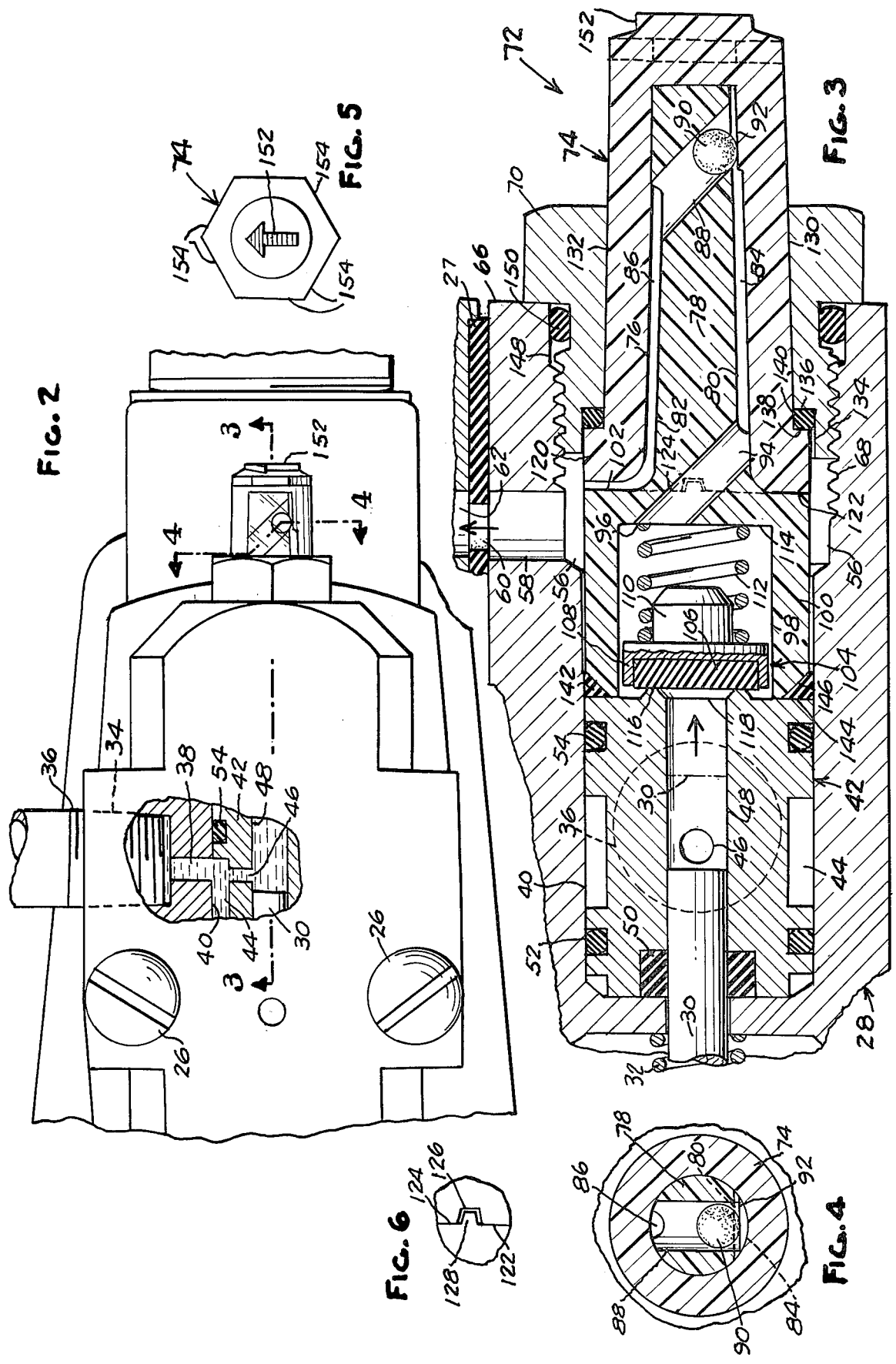

INJECTION LUBRICATING APPARATUS

This invention relates generally to lubricators of the type which utilize responses to variations of the condition of the air in an air line to actuate an injection type pump for delivering predetermined quantities of lubricant into the air line or to a motor or other equipment to be lubricated. More particularly, the invention involves lubricators of this type which have a transparent sight dome positioned in the lubricant flow path downstream of the pump and containing an element which is movable by pulses of the lubricant to provide a visual indication that the pump is operating satisfactorily.

Generally, the sight domes of such lubricators fall into two categories. In one, the movable element or bobber is disposed within a vertically extending passageway, is moved upwardly by the lubricant pulse and is returned downwardly by the force of gravity. A disadvantage of this type is that the entire lubricator must be mounted in such an orientation that the bobber passageway is right side up and extends in a vertical direction. In the other type lubricator, the bobber is spring returned following a lubricant pulse and the lubricator may thus be mounted in any desired orientation. However, this type lubricator does not operate reliably at low lubrication rates, for example, 1/20 of a drop per cycle (a drop being defined as 1/30 cc) since the relatively small pulses involved do not move the bobber against the force of its return spring through a readily observable distance.

The object of the present invention is to provide a relatively simple inexpensive sight dome structure improved to respond reliably to very small lubricant pulses even though the lubricator may be mounted in various different orientations relative to the vertical. One form of the invention is shown in the accompanying drawings wherein:

FIG. 2 is a fragmentary top plan view of the lubricator rotated 180° from the orientation of FIG. 1;

FIG. 3 is an enlarged scale sectional view on line 3—3 of FIG. 2;

FIG. 4 is an enlarged scale sectional view on line 4—4 of FIG. 2;

FIG. 5 is an enlarged scale elevational view of the right hand end of the sight dome shown in FIG. 2;

FIG. 6 is a fragmentary elevational view of interengaged portions of the sight dome members.

Figure 1:
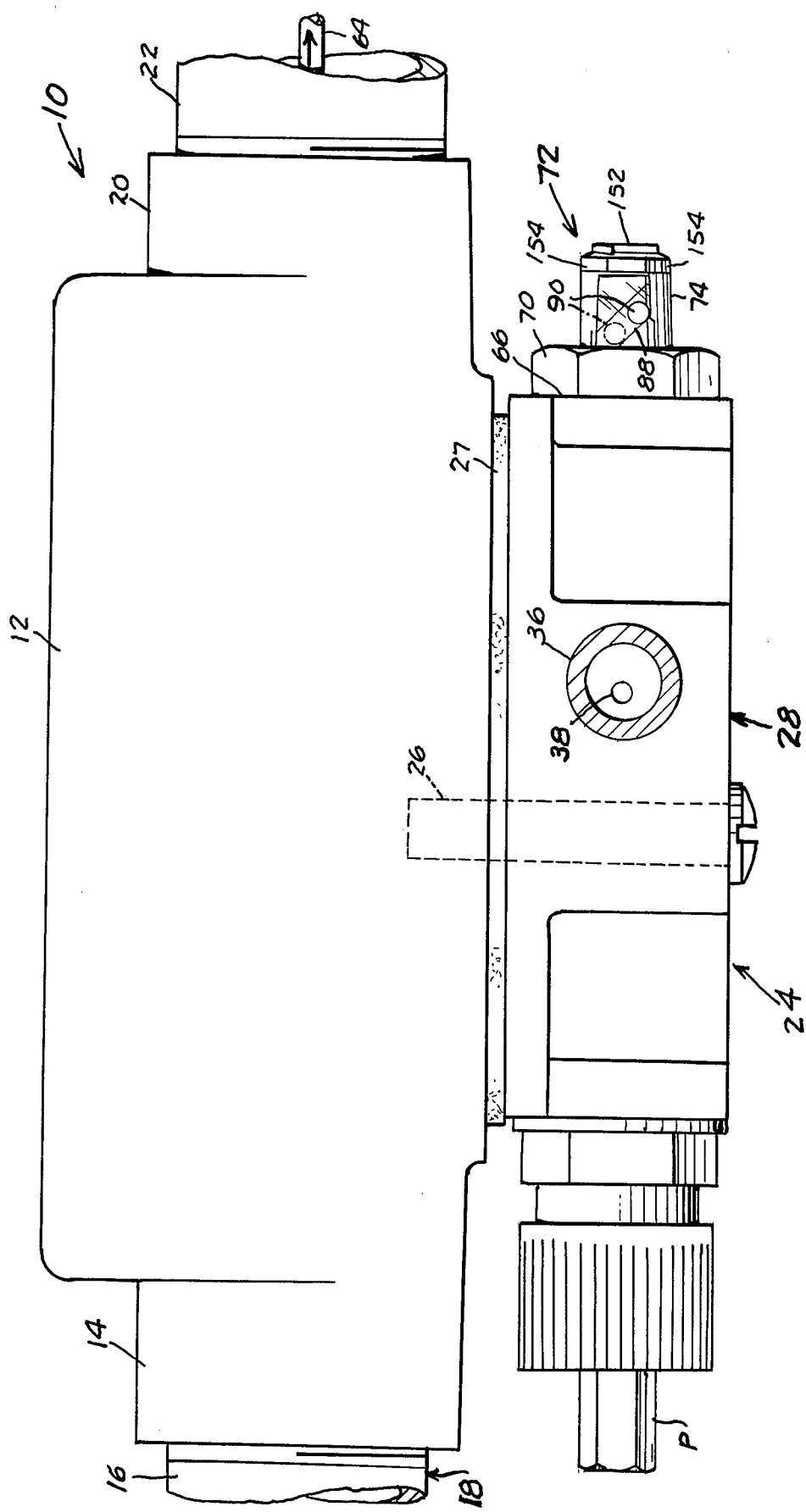
FIG. 1 is a side elevational view of the lubricator.

Shown in the drawings is a lubricator 10 having a body 12 with an inlet nipple 14 internally threaded to receive an upstream portion 16 of an air line 18 and having an outlet nipple 20 internally threaded to receive a downstream portion 22 of the air line. A lubricant injection pump 24 is mounted beneath body 12 by such means as bolting 26 and a gasket 27 is provided between the pump and body 12. Pump 24 has a body 28 with an internal pneumatic cylinder and piston, (not shown) a piston rod 30 on the piston forming the pump plunger.

Lubricator body 12 contains a device (not shown) which senses variations in the condition of the air in air line 18 such as starting and stopping of air flow, and in response to such variations introduces air under pressure into the pump cylinder for advancing plunger 30 from the solid line position to the dotted line position of FIG. 3 in its lubricant injection stroke and then relieves the air pressure in the cylinder to permit return of the plunger to the solid line position of FIG. 3 by spring 32 acting upon the piston. An example of such a sensing device is disclosed in my U.S. Pat. No. 3,926,279.

Pump body 28 has an opening 34 (FIG. 2) threaded for receiving a conduit 36 extending to a source of lubricant. Opening 34 continues in a port 38 which opens into an internal cylinder 40. A spool shaped insert 42 in cylinder 40 has an external groove 44 aligned with port 38 and a port 46 which extends between groove 44 and a cylindrical opening 48 within which plunger 30 reciprocates. Insert 42 is recessed to receive a seal 50 around plunger 30 and O-rings 52, 54 engaged against cylindrical surface 40.

Cylinder 40 has an enlarged portion 56 from which a lubricant outlet port 58 extends to deliver lubricant from pump 24 through an opening 60 in gasket 27 to a passageway 62 in body 12 for delivery to an outlet tube 64 threaded through air line 18 from the lubricator to the equipment to be lubricated. Between port 58 and an end 66 of the pump body, interior portion 56 is threaded at 68 for receiving a screw 70 by which a sight dome 72 is mounted on pump body 28.

Sight dome 72 has an outer cup-shaped member 74 with an internal surface 76 and an insert member 78 fitted within the interior of the cup. Cup 74 and insert 78 are made of a transparent lubricant resistant material such as a clear polycarbonate. Insert 78 has a flat 80 and a groove 82 which are spaced circumferentially apart (about 180° in the illustration) and which cooperate with inner cup surface 76 to form respectively lubricant passageways 84, 86 which are generally parallel. A relatively large diameter cylindrical bore 88 extends (in the illustrated form) at an angle of about 45° between passageways 84, 86 and a bobber 90 in the form of a ball is disposed in the bore. At the juncture of passageway 84 and bore 88 is a flat step 92 upon which ball 90 rests when pump plunger 30 is inactive.

Passageway 84 continues upstream in a cylindrical bore 94 preferably having the same diameter and angular orientation as bore 88. Bore 94 has an upstream end 96 which opens into the interior 98 of an enlarged diameter, cup-shaped, axial extension 100 of insert 78 disposed within cylindrical opening 40 in the pump body. Passageway 86 has a downstream radially extending portion 102 forming an outlet which opens into enlargement 56 for delivering lubricant to outlet port 58.

A check valve 104 is disposed within cup interior 98. Valve 104 includes a seal disc 106 supported within a retainer 108 having a guide plug 110 projecting into a coil spring 112 which is compressed against the bottom wall 114 of cup 100 and urges seal 106 into sealing engagement with a raised annular seat 116 around the outlet end 118 of plunger bore 48. Cup 74 adjacent its open end has a radial enlargement 120 which forms a shoulder 122 engaged against a radial shoulder 124 on enlargement 100 of insert 78. One shoulder (122 in the illustration) has a recess 126 and the other shoulder has a projection 128 engaged therein to restrain cup 74 and insert 78 against rotation relative to each other.

Mounting screw 70 has a cylindrical axial opening 130 within which a cylindrical outer surface 132 of cup 74 fits. Portions of the cup and insert 78 project entirely through opening 130 beyond the outer end of screw 70 to a location where bore 88 and ball 90 are visible. Opening 130 continues inwardly in a counterbore 134 which receives cup enlargement 120. The bottom of the counterbore defines a radial shoulder 136 which is opposed to a radial shoulder 138 on enlargement 120 and an O-ring 140 is disposed between shoulders 136, 138.

An O-ring 142 is compressed between an end wall 144 of insert 42 and a tapered end wall 146 of insert enlargement 100. Axial opening 40, 56, 68 in the pump body has a further enlarged portion 148 adjacent end 66 and an O-ring 150 is disposed between enlargement 148 and the exterior of screw 70.

Cup 72 is provided on its exterior with indicia of the orientation of the axis of bore 88. In the illustrated form of the invention this indicia is in the form of an arrow 152 molded into the material from a cup 74. This arrow lies on an axial projection of bore 88 and thus shows the direction of vertical extent of the axis of bore 88. Cup 74 has external surfaces 154 forming wrench flats for a purpose to be described and to this end cup 74 is shown as having a hexagonally shaped end portion.

To assemble sight dome 72 with pump body 28, cup 74, insert 78, mounting screw 70 and O-rings 140, 150 together with check valve 104 may first be preassembled and then inserted into the pump body through end 66 after O-ring 142 has been inserted and abutted against wall 144 of insert 42. Alternatively, these elements may be inserted sequentially into the pump body. In either event, mounting screw 70 is then turned to advance shoulder 136 thereon axially inwardly and the axial thrust of shoulder 136 is transmitted through O-ring 140 to shoulder 138 and through interengaged shoulders 122, 124 to insert enlargement 100 causing end wall 146 thereon to squeeze O-ring 142 against end wall 144 of insert 42. Under this pressure, O-ring 142 assumes the generally triangular configuration illustrated in FIG. 3.

When sight dome 72 has been initially assembled to pump body 28, cup 74, insert 78 and bore 88 will very likely have random angular orientation with respect to the pump body. Thus, should lubricator 10 be mounted in a horizontal attitude as illustrated in FIG. 1, the axis of bore 88 might extend not right side up and in a vertical plane but upside down or in a horizontal plane or any angular plane. To correct this condition, a tool such as a wrench is merely applied to flats 154 and force is exerted to turn cup 74 until arrow 152 is pointing directly upwardly. During this movement, cylindrical outer surface portion 132 of cup 74 turns within opening 130 of mounting screw 70 while the screw itself remains stationary. Rotation of cup 74 is transmitted to insert 78 by interengaged projection 128 and recess 126 on radial shoulders 124, 122 respectively of the insert and cup. Thus, rotation of cup 74 is followed by insert 78 and bore 88. Rotation of the sight dome is frictionally resisted by O-rings 140, 142 and this resistance is adequate to securely retain the sight dome in its adjusted position.

By a comparison of FIGS. 1 and 2, it will be seen that lubricator 10 can be mounted in any rotative position around the axis of air line 18 and sight dome 72 can be rotated to orient the axis of bore 78 right side up and in a vertical plane. Thus, ball 90 will respond properly to lubricant pulses in bore 88 regardless of such angular attitude of the lubricator, assuming that sight dome 72 has been properly adjusted. Moreover, lubricator 12 can be rotated clockwise from the attitude of FIG. 1 through any angle up to about 110° and ball 90 will respond properly without rotative adjustment of sight dome 72 because the axis of bore 88 extends at an angle to the axis of cup 74 and insert 78.

Upon further clockwise rotation of the lubricator, the axis of passageway 88 begins to approach the horizontal and ball 90 would not return gravitationally to platform 92 upon termination of a lubricant pulse. However, this condition can be corrected simply by turning sight dome 72 so that arrow 152 points upwardly i.e., in the clockwise direction. Similarly, upon further clockwise rotation of the lubricator through a complete 360° the axis of bore 88 can always be maintained at a steep enough angle to the vertical to insure proper gravity return of ball 90 following termination of a lubricant pulse.

Thus, lubricator 12 can be mounted in any angular attitude to meet space requirements or simply for convenience and (once sight dome 72 has been properly adjusted,) ball 90 will respond properly and reliably even to the relatively weak pulses of slow rate lubrication and will return properly under gravity after a pumping cycle.

It is, however, necessary to correlate the diameters of bore 88 and ball 90. On the one hand, ball 90 must be provided with adequate area exposed to the pressurized lubricant so that it will respond sensitively to relatively weak pulses. On the other hand, sufficient clearance must be provided between the ball and bore to enable the pressurized lubricant to flow past the ball in bore 88 and to allow the ball to move downwardly under the force of gravity through the lubricant in bore 88 when pressure is relieved at the end of a pumping cycle.

In a typical lubricator according to the present invention, ball 90 has a diameter of about 0.093 inch and bore 88 has a diameter of about 0.099 inch. Ball 90 reliably moves upwardly in bore 88 under a flow of 1/20 of a drop or less in each cycle of operation of plunger 30 and the ball reliably returns under the force of gravity when the flow ceases. This lubricator is designed for a maximum delivery rate per cycle of ½ drop though it will accept satisfactorily higher rates. A typical lubricator according to this invention is also sensitive enough to respond to manual operation of pump 24 by pressing axially inwardly an external plunger P that is connected to the piston to which plunger 30 is attached.

By providing bore 88 and ball 90 with larger diameters, the capacity of a lubricator can be increased but the sensitivity of the ball to lubricant pulses is decreased. Conversely, by providing the bore and ball with smaller diameters, the sensitivity of the ball to weak pulses is increased while the capacity of the lubricator is decreased. While bore 88 is illustrated as extending at an angle of about 45° to the axis of cup 74 and insert 78, as a practical matter bore 88 could extend at any angle between about 30° and about 60° relative to the cup and insert axis. The term "bore" is used herein merely for convenience in description and is not intended to imply any particular method of forming this part of the flow path.

In a conventional lubricator, plunger 30 in each cycle of operation forces a quantity of lubricant from a chamber containing a check valve directly outwardly through outlet 58. This chamber is closed by a screw and O-ring and the screw provides the reaction point for the check valve spring analogous to spring 112. To equip a conventional lubricator with a sight dome 72 the closure screw on the conventional pump body and the check valve are merely removed and an assembly of a mounting screw 70, cup 74, insert 78, O-rings 140, 142 and check valve 104 is inserted in its place. The assembly costs about 40 cents to manufacture.

I claim:

1. In a lubricator having operating means adapted to be connected to an air line for responding to variations of the condition of the air in the air line, an injection pump operable under the influence of responses of said operating means to move intermittently a substantially predetermined quantity of lubricant through a flow path for delivery at an outlet, a portion of said flow path being defined by transparent means, and a bobber within said transparent means movable responsive to lubricant flow therein and being gravity returnable to provide visual indication of such intermittent flow, improved structure wherein, said transparent means is mounted for turning movement on said pump about an axis,
said flow path including a bore in said transparent means having an axis which extends at a non-perpendicular angle to that of said turning movement,
said flow path having a segment which adjoins an upstream portion of said bore at a juncture adjacent means forming a support,
said bobber being fitted with clearance in said bore and resting solely under the force of gravity on said support during static condition of lubricant in said flow path.

2. The structure defined in claim 1 wherein said angle is in the range from about 30° to about 60°.

3. The structure defined in claim 2 wherein said angle is about 45°.

4. The structure defined in claim 1 wherein said flow path has generally parallel portions, one extending from said juncture in an upstream direction and the other extending from said bore downstream toward said outlet.

5. The structure defined in claim 4 wherein said flow path includes a portion which extends upstream from said one parallel portion in a direction which is generally parallel to that of said bore.

6. The structure defined in claim 1 and including means providing frictional resistance to said turning movement, said transparent means having on its exterior indicia of the orientation of the axis of said bore.

7. The structure defined in claim 6 wherein said indicia defines generally a line which comprises a projection of the axis of said bore in the direction of said axis of said turning movement.

8. The structure defined in claim 7 wherein said flow path has portions which are generally parallel to each other and generally parallel to said axis of said turning movement, on parallel portion extending from said juncture in an upstream direction and the other extending from said bore downstream toward said outlet.

9. The structure defined in claim 6 wherein said pump has a body, said frictional resistance comprising O-ring means frictionally engaged with means on said body and transparent means.

10. The structure defined in claim 9 wherein said means on said body and transparent means comprises two axially spaced shoulders on said body and two axially spaced shoulders on said transparent means opposed to said shoulders on said body, said O-ring means comprising an O-ring disposed between each of the opposed shoulders.

11. The structure defined in claim 10 wherein said angle is in the range of about 30° to about 60°, said bobber comprising a ball.

12. For a lubricator in which lubricant is moved intermittently, a visual indicator of such movement which comprises, means forming a body having a transparent region, said body means having mounting means adapted to be mounted on a lubricator and from which said transparent region projects for visual observation, said body means being turnable relative to said mounting means about an axis,
said body means having an internal passageway extending between an inlet and an outlet and being adapted to form a flow path for lubricant, said passageway including a portion in said transparent region extending along an axis disposed at a non-perpendicular angle to said axis of turning movement,
and a bobber in said portion movable responsive to lubricant flow in said path and gravity returnable responsive to cessation of such flow.

13. The indicator defined in claim 12 wherein said mounting means comprises a screw externally threaded for connection to a lubricator and having an axial opening in which said body means is turnable.

14. The indicator defined in claim 12 wherein said body means has a hollow axial extension into which the upstream end of said inlet opens and a check valve in said extension.

15. The indicator defined in claim 12 wherein said angle is between about 30° and about 60°.

16. The indicator defined in claim 15 wherein said angle is about 45°.

17. The indicator defined in claim 12 wherein said passageway includes a second portion which extends between said inlet and first said portion, and a third portion which extends between said first portion and said outlet, said second and third portions being generally parallel to said axis of turning movement.

18. The indicator defined in claim 17 wherein said second portion has a segment adjacent said inlet which extends generally parallel to said first portion.

19. The indicator defined in claim 12 wherein said body means and mounting means have means frictionally yieldably resisting said relative turning movement.

20. The indicator defined in claim 19 wherein said resisting means comprises shoulders on said body means and mounting means spaced apart axially and O-ring means frictionally engaged by said shoulders.

21. The indicator defined in claim 12 wherein said body means is comprised of an outer cup-shaped element and an inner element fitted therein, said passageway portion comprising a bore in said inner element.

22. The indicator defined in claim 21 wherein said mounting means comprises a screw having an axial opening therethrough, said body means extending axially turnably through said opening, said screw being adapted to be threaded into an opening in a lubricator, said screw and body means being cooperable to form a closure for a lubricator opening into which said screw is threaded.

23. The indicator defined in claim 22 wherein said screw has a generally radial internal shoulder, said outer element having a generally radial external shoulder spaced axially from said shoulder on said screw, an O-ring disposed between said shoulders, when said indicator is mounted on a lubricator, said O-ring providing frictionally yieldable resistance to said turning movement.

24. The indicator defined in claim 23 wherein said outer element has on its exterior indicia of the orientation of the axis of said passageway portion, said indicia comprising a projection of the axis of said passageway portion in the direction of said axis of turning movement, said inner and outer elements being provided with generally radial shoulders having said interengaged means, said inner element having an axial hollow extension of its said shoulder dimensioned and contoured to receive a check valve in a lubricator, said inlet having an upstream end which opens into said extension.

25. The indicator defined in claim 21 wherein said outer element has on its exterior indicia of the orientation of the axis of said passageway portion, said inner and outer elements being provided with means interengaged to constrain said elements against relative rotation.

26. The indicator defined in claim 25 wherein said outer element has an open end surrounded by a generally radial shoulder, said inner element having a base surrounded by a generally radial shoulder, said shoulders being provided with said interengaged means.

27. The indicator defined in claim 26 wherein said inner element has a hollow portion extending axially from its said shoulder and being dimensioned and contoured to receive a check valve in a lubricator.

28. The indicator defined in claim 27 wherein said hollow portion forms said inlet.

29. The indicator defined in claim 27 and including in addition a check valve in said hollow portion.

30. The indicator defined in claim 29 wherein said check valve includes a valve member and a coil spring compressible between said valve member and shoulder.

* * * * *